NONELECTRONIC MAGNETIC RECORDING SYSTEM

Filed Sept. 30, 1966

*INVENTORS*
WILLIAM C. CARROLL
HOWARD T. JOHNSTON, JR.
*BY*
Sughrue, Rothwell, Mion, Zinn & Macpeak
ATTORNEYS 3,479,036
NONELECTRONIC MAGNETIC RECORDING SYSTEM William C. Carroll, Poughkeepsie, and Howard T. Johnston, Jr., La Grange, N.Y., assignors to International Business Machines Corporation, Armonk, N.Y., a corporation of New York Filed Sept. 30, 1966, Ser. No. 583,224
Int. Cl. G11b 5/02
U.S. Cl. 274—4 1 Claim

ABSTRACT OF THE DISCLOSURE

A nonelectric, portable, magnetic recording system. A magnetic tape carries a prerecorded high-frequency magnetic signal. The tape moves past a mechanically oscillating permanent magnet stylus which has oscillations controlled by some external forces such as sound waves. As the stylus moves over the tape, it partially erases the prerecorded magnetic signal, thereby recording, for example, the sound waves.

This invention relates to a nonelectronic, portable, magnetic recording system, and more particularly, to a completely mechanical system which may take the form of a self-contained, hand-held pocket-size recorder.

There is need today for a simple, low cost, personal dictation device allowing an unlimited number of recorders to be utilized in conjunction with a single, much more expensive read unit. In this manner, "lower echelon employees" may make immediate audio records, eliminating waiting time associated with joint use of a single, expensive recording device on a time sharing basis. The low cost personal dictation devices have great application for air travel use, since the electronic devices commonly in vogue are of little or no use due to the electronic interference which is inherently present in moving aircraft. Low cost audio recorders have great application in the law enforcement field wherein each police patrolman could carry one of the recorders for on the spot recording of confessions or accounts by witnesses. The foot patrolman may "exchange" recorders at a modified call box where a remote reader could "read" the used recorder at command of headquarters and re-record, and at the same time reset the recorder for subsequent use. In the medical field, doctors, during patient visitation periods, can readily record observations, orders, etc., for subsequent use with ready exchange of the unit when desired, with no loss of information or time. The possible uses for a low cost, purely mechanical audio recorder are endless and the above examples are only illustrative of some of the existing needs for such devices.

It is, therefore, a primary object of this invention to provide an improved nonelectronic, portable audio recording system which may readily use either a magnetic tape, drum, disc or belt as the magnetic recording medium.

It is a further object of this invention to provide an improved nonelectronic, portable, magnetic recording system which may be readily incorporated in a pocket-size, self-contained, extremely low cost unit for recording low fidelity, audio information for transcription to a second, high fidelity recording machine.

It is a further object of this invention to provide an extremely low cost, nonelectronic, portable, magnetic recording system involving the erasure of a prerecorded single, high frequency tone in which the prerecording of the single frequency tone occurs during reading of the previously recorded audio information.

The foregoing and other objects, features and advantages of the invention will be apparent from the following more particular description of preferred embodiments of the invention, as illustrated in the accompanying drawing.

In general, the present invention is directed to a low cost, nonelectronic, magnetic recording system which includes the prerecording of a single high frequency tone on a magnetic medium, the passing of the medium under a permanent magnet stylus at a constant rate of speed and mechanically oscillating the stylus transversely of the line of movement of the magnetic medium in response to a signal to disturb the prerecorded pattern. The invention has great applicability to a low cost, compact, audio recording system involving audio-mechanical stylus operating means for moving a permanent magnet at right angles to the longitudinal axis of the recording medium to thereby "erase" the single high frequency, prerecorded tone. Preferably, a magnetic recording tape carries a prerecorded, single frequency tone, magnetic record track and a single or double edged stylus is transversely vibrated along one edge of said track by an acoustical diaphragm link mechanism to modulate the prerecorded pattern.

Figure 1:
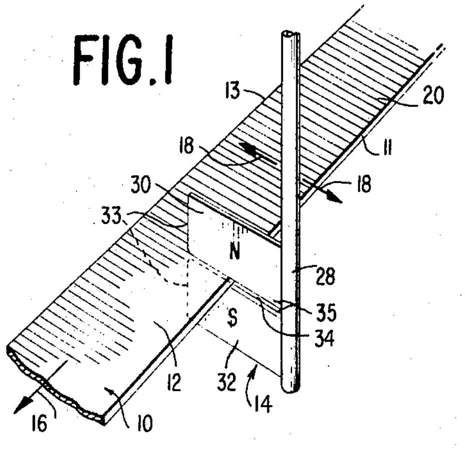
FIGURE 1 is a perspective view of basic components of one embodiment of the magnetic recorder system of the present invention during the recording mode.
Figure 2:
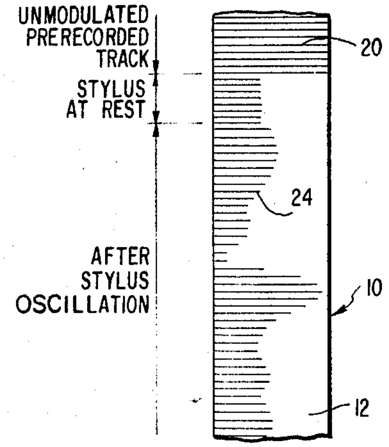
FIGURE 2 is an enlarged plan view of a section of magnetic tape during audio recording by the method of the present invention.
Figure 3:
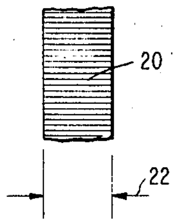
FIGURE 3 is a plan view of the tape section shown in FIGURE 2 after prerecording with a single high frequency tone prior to modulation.

Referring to the drawing, there is shown in FIGURE 1 the basic elements of one embodiment of the recorder system of the present invention in which an audio record is applied to a magnetic record, in this case, magnetic tape 10. The magnetic tape 10 carries a magnetizable surface 12, with the surface 12 being previously magnetically prerecorded with a single high frequency tone by conventional means (not shown). An upper desirable limit for the modulated signal is 3000 cycles per second. Fine signal definition suggests at least six sample points per cycle, which implies a minimum prerecorded carrier frequency as 18,000 c.p.s. For example, the system of the present invention may employ a standard one-half inch tape having a prerecorded carrier signal of 3200 flux changes per inch, that is, 1600 cycles per inch. Since frequency equals density times speed, for a tape speed of 15 inches per second, F equals 1600 cycles per inch times 15 inches per second or 24,000 cycles per second which exceeds the required minimum and provides the carrier to signal ratio of 8 to 1. The prerecorded magnetic tape is passed longitudinally under a permanent magnet stylus 14 at a constant rate of speed in the direction indicated by arrow 16. The stylus 14 is oscillated at right angles to the longitudinal axis of the moving tape 10, as indicated by arrows 18. The oscillation or mechanical actuation is produced by mechanical link means (not shown) connected to a diaphragm, crystal device or other conventional audio oscillating producing means (not shown). A "sound powered" microphone may be used for this purpose. Thus, recording is achieved by "an erase" technique. The term "erase" as used throughout this description identifies the action between the oscillating stylus 14 and the longitudinal moving magnetic tape 10. The stylus action "disturbs" the prerecorded pattern in the manner shown in FIGURE 2. Initially, the prerecorded pattern takes the form shown in FIGURE 3. A pure single high frequency prerecorded signal forms prerecorded track 20 of a width identified by the arrows 22 (FIGURE 3). Referring to FIGURE 2, the prerecorded pattern 20 is modified by the mere presence of a nonmoving stylus and is further modified in response to mechanical oscillation of the stylus 14 to form a longitudinal zigzag path 24. This path or modulated erasure line 24 is defined by the stylus oscillation as the sound source causes the stylus to vibrate 90° to the tape. Thus, a modulated "erase" line 24 is produced which is quite similar to the oscillation outline of a modulated disc recording groove.

Figure 4:
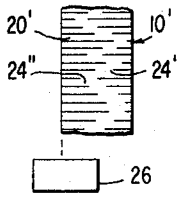
FIGURE 4 is a plan view of the tape shown in FIGURE 3 after recording by a centered stylus.

Recording by erasing, as outlined above, may be achieved in a wide variety of ways and means. For instance, referring to FIGURE 4, the prerecorded track 20' which is identical to that shown in FIGURE 3, is modulated by moving the track longitudinally with respect to a stylus, centered at rest, which when oscillating produces a recording path defined by modulated erase lines 24' on the right and 24'' on the left of the oscillating central stylus. The centrally located audio induced record may be read by a single head 26 which reads only one half of the tape.

Figure 5:
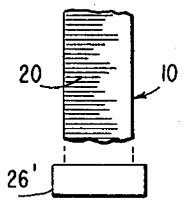
FIGURE 5 is a plan view of the basic components of a second embodiment of the present invention employing a track modulated by mechanical oscillation of an edge stylus and a read head for transcribing the same.

This is to be contrasted to the showing in FIGURE 5 wherein an audio recording of the type shown in FIGURE 2 is produced by an edge stylus. The modulated track 20 carried by tape 10 is read by a conventional magnetic read head 26'.

Referring again to the embodiment of FIGURE 1, a double edged permanent magnet stylus 14 includes a tubular stem portion 28 terminating in a pair of right angled spaced permanent magnet blades 30 and 32. The blades 30 and 32 are separated by a longitudinal slot 34 which acts to receive the right-hand edge of magnetic tape 10 when the stylus is at rest. Slot 34, therefore, provides a double edge to the stylus eliminating the need for a separate return path for the magnetic flux. The blades are preferably covered with epoxy shoes 35 along respective edges, adjacent the tape surfaces to prevent the blades from scraping oxide off the tape. The two blades 30 and 32 comprise two carbon steel segments fixed to the tubular stem 28, separated slightly to form the tape receiving aperture or slot 34. The blades are cemented into a slit (not shown) formed on the tape side of the aluminum tube 28. The gap edges of the carbon steel blades 30 and 32 are ground sharp in order to create a fine-line magnetic flux path across the gap. The stylus blades 30 and 32 are magnetized as shown to set up the north-south polarity across the tape receiving gap. The inner ends or edges 33 of blades 30 and 32 are aligned with the center line of the moving tape 10 when the stylus is at rest, the effect of this being best shown by reference to FIGURE 2. Edge 11 of the tape 10 is longitudinally centered within slot 34 with stylus 14 at rest. With the stylus at rest, one half of the prerecorded track 20 is erased as the tape passes through slot 34. With the tubular support 28 being oscillated at right angles to the longtiudinal axis of the tape, the stylus assembly may oscillate in either direction to the maximum extent that edges 33 of the blade are in alignment with either edge 11 or 13 of tape 10.

Figure 6:
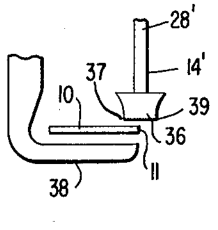
FIGURE 6 is an elevational view of a permanent magnet recording stylus in alternate form.

Referring to FIGURE 6, there is shown an alternate configuration for the magnetic recording stylus. In this case, stylus 14' is provided with a stem 28' but instead of terminating in a head structure involving two spaced rectangular blades, a single edged, laminated, permanent magnet element 36 is provided. The planar head element 36, which is frustoconical in shape, acts in conjunction with a magnetic return path 38, to provide an appropriate flux path for the magnetic flux generated by permanent magnet 36. Preferably, the magnetic flux return element 38 is mechanically coupled to stem 28' so as to move with the stylus 14'' as it oscillates at right angles to the longitudinal axis of moving magnetic record tape 10.

Where "tape edge" recording is achieved with a flat face stylus, the stylus width is proportional so that it covers the tape track out to the edge on full excursion in either direction. That is, with the head 36 oscillated to its full extent away from tape 10, edge 37 of the head would be in line with the outer edge 11 of the tape. Likewise, when the stylus 36 is oscillated inwardly to its greatest extent, the edge 39 of head 36 would be in alignment with the outer edge 11 of the tape. By guiding the tape on the "record edge" both in recording and reading operations, tracking and alignment problems are minimized.

It is intended that the low cost magnetic recorder system of the present invention preferably take the form of a personal recorder for a relatively large number of people allowing the audio information to be later transcribed by a high cost, high fidelity transcriber. The person using the mechanical recorder would, after dictating, turn the tape or other record form into the typist who provides them with a freshly recharged (actually rerecorded with a basic high frequency tone) tape. The pocket-size recorder (not shown) may readily comprise a plastic or metal case which would house a drive mechanism (either battery powered or spring-wound), a conventional acoustical diaphragm link mechanism, sound sensing means (a diaphragm for oscillating the link mechanism carrying the stylus), means for initiating and terminating movement of the tape longitudinally of the stylus, as well as a "read aperture" permitting the recorded tape to be read out to the high cost, fidelity transcriber. The "read aperture" or other means allowing the sensing of "erase line 24 or erase lines 24'–24''" is most necessary, as with the extremely low cost recorder system of the present invention, the recorder has no self-contained playback facilities to "read the tape." Some type of unit is required with the read unit transcribing the taped message to a second recording machine, such as an IBM Executary. Preferably, as the read unit transcribes the audio message, the high frequency signal is simultaneously prerecorded on the tape, thus readying the recorder for its next user. Obviously, the prerecording of the single high frequency tone on the tape may be done at high speed or at the same speed at which transcribing is taking place.

Figure 7:
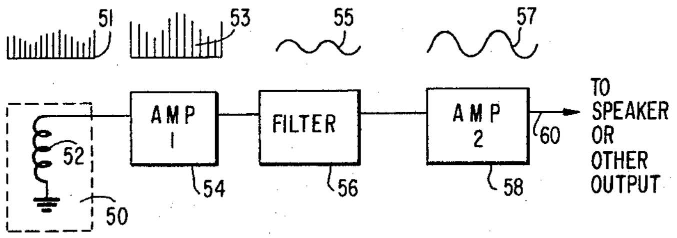
FIGURE 7 is a block diagram of one type of transcribing means used in conjunction with a recording formed by the method of the present invention.

With regard to the reader unit, the unit may readily consist of read/erase/record heads, recorder tape operating means, suitable electronic capabilities for read/erase/record and transcribing operations. Reference to FIGURE 7 shows, in block form, the elements necessary to transcribe the audio induced information from either tape 10 of FIGURE 1 or tape 10' of FIGURE 4. The read head is shown at 50 by the dotted line rectangle and includes grounded pick-up coil 52. The output 51 of head 50 is amplified by amplifier 54 prior to removal of the pure frequency tone 53 (normally in the 20K/30K range) by filter means 56. After filtering out the pure frequency tone, the signal 55 is amplified by second amplifier 58 and the amplified signal 57 delivered to audio speaker means or other output devices (not shown) as indicated by arrow 60.

The "erase" recorded pattern in the prerecorded tape presents a striking parallel to an AM carrier with modulated signals. The reader unit read head feeds this signal into a suitable converter based on simple AM radio practice, which feeds it to the transcriber amplifier for recording on selected recording means, such as an IBM Executary, tape recorder, etc. If desired, the converter may feed an audio amplifier for direct reading. Either a standard type of magnetic tape read head, a "null" magnetic head or a modified variable reluctance head may be used to read the "erase" recording. If a pure frequency in the 20K/30K range is prerecorded on the tape, it is possible that the standard radio components and practice may be employed in the read unit. Edge recording is preferred since edge recording minimizes critical tracking considerations.

While the stylus has been described as being moved by audio induced mechanical means, it is obvious that any source of low frequency mechanical vibration may provide the necessary modulating motion. Thus, the stylus may be moved by electromechanical, crystal, acoustical means or by direct coupling to vibrating bodies.

The permanent magnet stylus may comprise any conventional permanent magnet material in laminated form or otherwise, and the invention has application to all conventional magnetic tapes and to other magnetic storage devices, such as drums, discs, etc.

While the invention has been particularly shown and described with reference to preferred embodiments, it will be understood by those skilled in the art that various changes in the form and details may be made therein without departing from the spirit and scope of the invention.

What is claimed is:

1. A magnetic recording method comprising the steps of (a) recording a single, high frequency tone over the entire area of a magnetic tape, (b) positioning a permanent magnet stylus adjacent a surface of the pre-recorded tape, said stylus having a work face of a width less than the width of said tape, (c) moving said tape past said stylus at a constant rate of speed, and (d) mechanically oscillating said stylus in response to an input signal transversely of the direction of motion of said tape and in a plane parallel to a surface of said tape, the amplitude of oscillatory motion of said stylus being limited to a distance less than the width of said tape.

References Cited

UNITED STATES PATENTS

| | | | |
|---|---|---|---|
| 3,159,942 | 12/1964 | Fiske | 274—1 |
| 1,727,645 | 9/1929 | Hoofnagle | 274—4 |
| 3,013,124 | 12/1961 | Epstein | 179—100.2 |
| 2,632,061 | 3/1953 | Begun | 179—100.2 |
| 1,886,616 | 11/1932 | Alverson | 179—100.2 |

FOREIGN PATENTS

| | | |
|---|---|---|
| 206,927 | 4/1954 | Japan. |

OTHER REFERENCES

S. W. Athey, Magnetic Tape Recording (NASA), January 1966, page 55.

LEONARD FORMAN, Primary Examiner

ROGER A. FIELDS, Assistant Examiner

U.S. Cl. X.R.

179—100.2